(12) United States Patent
Kim et al.

(10) Patent No.: US 9,998,754 B2
(45) Date of Patent: Jun. 12, 2018

(54) METHOD OF CALCULATING DISCONTINUITY OF MOTION VECTOR AND FALLBACK PERFORMING METHOD USING THE SAME

(71) Applicant: Anapass Inc., Seoul (KR)

(72) Inventors: Tae Jin Kim, Seoul (KR); Daehyun Kim, Seoul (KR); Jae Hun Lee, Seoul (KR)

(73) Assignee: ANAPASS INC., Seoul (KR)

( * ) Notice: Subject to any disclaimer, the term of this patent is extended or adjusted under 35 U.S.C. 154(b) by 543 days.

(21) Appl. No.: 14/538,952

(22) Filed: Nov. 12, 2014

(65) Prior Publication Data

US 2015/0131731 A1 May 14, 2015

(30) Foreign Application Priority Data

Nov. 12, 2013 (KR) .................... 10-2013-0136796

(51) Int. Cl.
*H04N 7/12* (2006.01)
*H04N 19/513* (2014.01)
*H04N 7/18* (2006.01)
*H04N 5/21* (2006.01)

(52) U.S. Cl.
CPC ............ *H04N 19/521* (2014.11); *H04N 5/21* (2013.01); *H04N 7/18* (2013.01)

(58) Field of Classification Search
CPC .. H04N 7/26; H04N 7/32; H04N 5/21; H04N 7/00; H04N 5/00; H04N 19/00
See application file for complete search history.

(56) References Cited

U.S. PATENT DOCUMENTS

| 8,280,876 B2 | 10/2012 | Ma et al. | |
|---|---|---|---|
| 2004/0190623 A1 | 9/2004 | Lunter | |
| 2009/0110075 A1* | 4/2009 | Chen | H04N 19/51 375/240.16 |
| 2009/0245694 A1* | 10/2009 | Sartor | H04N 7/014 382/300 |

FOREIGN PATENT DOCUMENTS

| CN | 1636406 A | 7/2005 |
|---|---|---|
| EP | 1862970 A1 | 12/2007 |
| WO | WO 2008/139936 A1 | 11/2008 |

OTHER PUBLICATIONS

Jun. 2, 2017, Chinese Office Action for related CN application No. 201410645328.9.

* cited by examiner

*Primary Examiner* — Maryam A Nasri
(74) *Attorney, Agent, or Firm* — Paratus Law Group, PLLC

(57) ABSTRACT

A method of calculating discontinuity of a motion vector includes obtaining at least any one of a k-th projected forward motion vector by a forward motion vector of a block and a k-th projected backward motion vector by the forward motion vector and at least any one of a k-th projected forward motion vector by a backward motion vector and a k-th projected backward motion vector by the backward motion vector; obtaining inconsistency of forward motion vector to k-th frame projection and inconsistency of backward motion vector to k-th frame projection by calculating a first difference function using the obtained vectors, and calculating discontinuity using the inconsistency of forward motion vector to k-th frame projection and the inconsistency of backward motion vector to k-th frame projection.

14 Claims, 7 Drawing Sheets

METHOD OF CALCULATING DISCONTINUITY OF MOTION VECTOR AND FALLBACK PERFORMING METHOD USING THE SAME

CROSS-REFERENCE TO RELATED APPLICATION

This application claims the benefit under 35 U.S.C. § 119(a) of Korean Patent Application No. 10-2013-0136796, filed on Nov. 12, 2013 in the Korean Intellectual Property Office, the entire disclosure of which is incorporated herein by reference for all purposes.

BACKGROUND

The following description relates to a method of calculating discontinuity of a motion vector and a fallback performing method using the same.

Video information may have a variety of frame scanning rates per second, and a display device may display the video information by performing image processing such as frame rate conversion (FRC) with respect to the video information having the variety of frame scanning rates per second. When the input frame rate per second of the video information is lower than a frame displaying rate, the display device may interpolate the video information into a frame image obtained by performing image processing such as motion estimation (ME) or motion compensation (MC).

The basic assumption of ME and MC is that most of image areas included in consecutive two image frames in terms of time may have motion within a predetermined range in the image frame while having strong similarity with each other. However, in a case of severe camera movement or scene change, the above-described strong correlation deviates, and therefore the basic assumption on ME and MC is not met well. When ME is performed in such a condition, motion vector information that is unsuitable for MC may be extracted, and the obtained conversion images cause users looking at the screen to get ungraceful impression by degraded image quality. Thus, in this case, MC should not be performed.

In frame rate conversion technologies in which an MC technique is applied, a fallback technique is technology that may generate an output screen so as to guarantee the minimal image quality without performing MC when the image quality appears to be damaged by such MC.

SUMMARY OF THE INVENTION

The image quality of the result by the fallback process is superior to that of an image in which an error is generated in ME and MC from the inappropriate motion information. However the image quality of the result by the fallback process is inferior to that of an image generated properly in ME and MC using the correct motion information. For example, there are a first area which have to be done with the fallback process due to the inappropriate motion information and a second area which will be inferior with the fallback process as like an area where a text scroll is performed. And if the first area and the second area are located within neighboring area in a block of image, the fallback process need to be preferably performed selectively or dynamically in the neighboring area.

The following description is directed to a fallback processing method that may determine whether to perform fallback using criteria in two different points of view to a displayed image and perform fallback by calculating a fallback level according to the determination result, thereby minimizing degradation of the image quality.

In one general aspect, there is provided a method of calculating discontinuity of a motion vector including: obtaining at least any one of a k-th projected forward motion vector by a forward motion vector of a block and a k-th projected backward motion vector by the forward motion vector and at least any one of a k-th projected forward motion vector by a backward motion vector and a k-th projected backward motion vector by the backward motion vector; obtaining inconsistency of forward motion vector to k-th frame projection and inconsistency of backward motion vector to k-th frame projection by calculating a first difference function using at least any one of the forward motion vector, the k-th projected forward motion vector by the forward motion vector, and the k-th projected backward motion vector by the forward motion vector and calculating the first difference function using at least any one of the backward motion vector, the k-th projected forward motion vector by the backward motion vector, and the k-th projected backward motion vector by the backward motion vector; and calculating discontinuity using the inconsistency of forward motion vector to k-th frame projection and the inconsistency of backward motion vector to k-th frame projection.

In another general aspect, there is provided a fallback performing method including: calculating unreliability of a motion vector included in a moving object in two frames classified in terms of time; calculating discontinuity of the motion vector for a predetermined time; calculating a fallback level from the unreliability and the discontinuity; and performing fallback based on the calculated fallback level.

In yet another general aspect, there is provided a fallback performing method including: obtaining unreliability of a motion vector; comparing the obtained unreliability of the motion vector and a threshold value for unreliability; calculating discontinuity of the motion vector when the unreliability of the motion vector is less than the threshold value for unreliability; comparing the calculated discontinuity of the motion vector and a threshold value for discontinuity; classifying the block into a fallback protection block when the discontinuity of the motion vector is less than the threshold value for unreliability; and setting a fallback level according to types and the number of the classified block.

Figure 1:
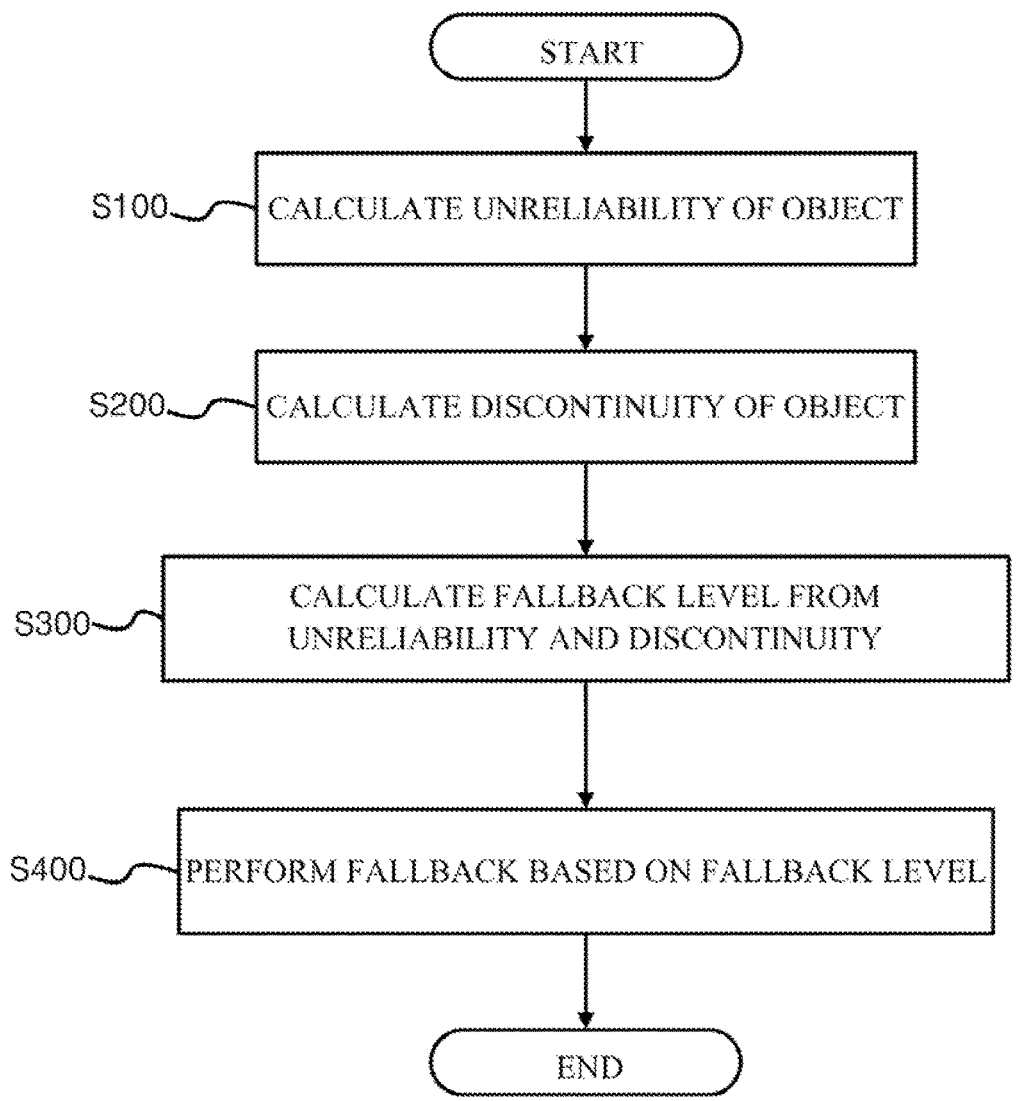
FIG. 1 is a flowchart illustrating an example of a fallback performing method.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular embodiments only and is not intended to be limiting of the present inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In reference drawings for describing exemplary embodiments of the present disclosure, size, height, thickness, etc. are intentionally exaggerated for convenience of description and ease of understanding, but are not enlarged or reduced according to a ratio. Also, in the drawings, some elements may be intentionally reduced, and other elements may be intentionally enlarged.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a fallback performing method will be described in detail with reference to the accompanying drawings FIG. 1 is a flowchart illustrating an example of a fallback performing method.

Referring to FIG. 1, the fallback performing method according to the example includes calculating unreliability of a motion vector included in a moving object in two frames classified in terms of time, calculating discontinuity of the motion vector for a predetermined time, calculating a fallback level from the unreliability and the discontinuity, and performing fallback based on the calculated fallback level.

First, in operation S100, unreliability of a moving object in two frames classified in terms of time is calculated. According to an embodiment, a forward motion vector $v_t$ and a backward motion vector $u_t$ of a block included in the moving object in the consecutive two frames $I_t$ and $I_{t+1}$ are obtained. The block included in the object is also moved as the object is moved during the two frames. A motion vector of the block that is formed as the frame advances from $I_t$ to $I_{t+1}$ is referred to as a forward motion vector $v_t$, and a motion vector of the block that is formed as the frame advances in a direction opposite to a time flow is referred to as a backward motion vector $u_t$. Next, a first difference function D1 is calculated using the obtained forward motion vector $v_t$ and backward motion vector $u_t$. The first difference function outputs a magnitude of a difference vector between the forward motion vector $v_t$ of the block and a reverse vector $-u_t$ of the backward motion vector $u_t$ of the block. However, when the forward motion vectors $v_t$ and $v_{t-1}$ are input to the first difference function, a magnitude of a difference vector between the input two forward motion vectors is output. That is, the first difference function D1 is defined as the following Equation 1.

$$D1(v,u)=|v_t-(-u_t)|$$

$$D1(v_t,v_{t-1})=|v_t-v_{t-1}| \quad \text{[Equation 1]}$$

Figure 2B:
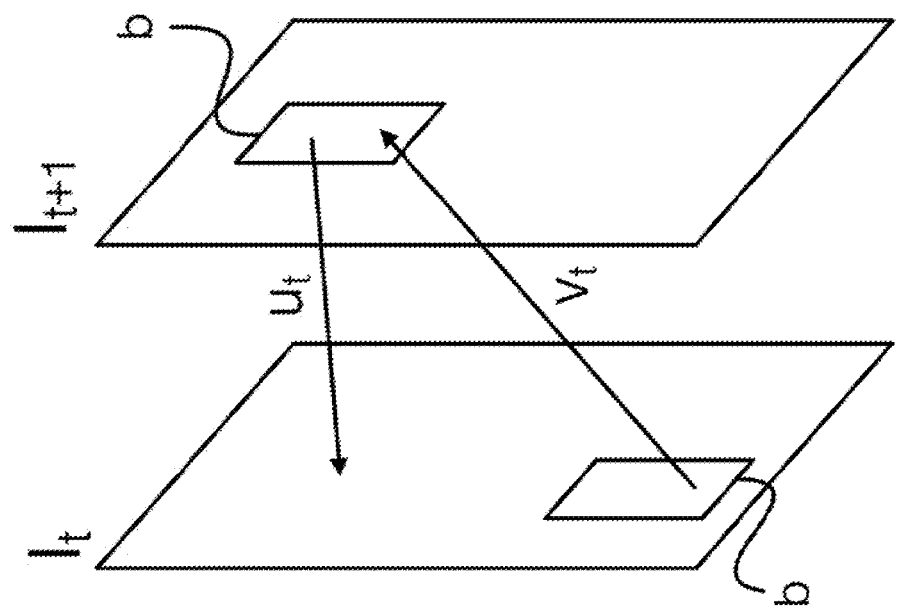
FIG. 2B illustrates another example of a forward motion vector and a backward motion vector of a moving block in consecutive frames $I_t$ and $L_{t+1}$.
Figure 2A:
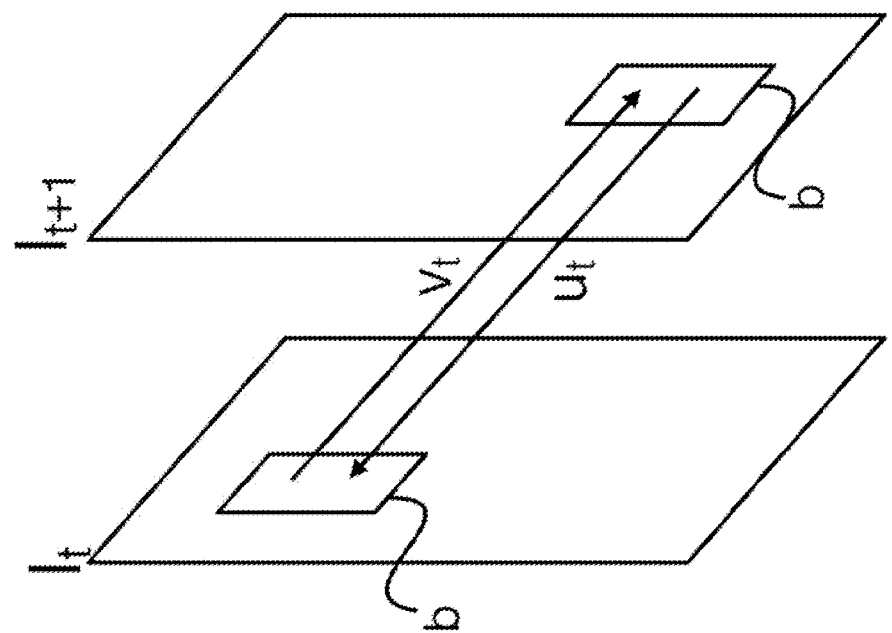
FIG. 2A illustrates an example of a forward motion vector and a backward motion vector of a moving block in consecutive frames $I_t$ and $I_{t+1}$.

FIG. 2A illustrates an example of a forward motion vector and a backward motion vector of a moving block in consecutive frames $I_t$ and $I_{t+1}$. And FIG. 2B illustrates another example of a forward motion vector and a backward motion vector of a moving block in consecutive frames $I_t$ and $I_{t+1}$.

Referring to FIG. 2A, in a case in which the forward motion vector $v_t$ and backward motion vector $u_t$ of a block b included in the moving object in the consecutive two frames $I_t$ and $I_{t+1}$ are shown, the reverse vector $-u_t$ of the backward motion vector is the same as the forward motion vector, and therefore a difference vector therebetween is "0". However, as shown in FIG. 2B, in a case in which the forward motion vector $v_t$ and backward motion vector $u_t$ of the block b included in the moving object in the consecutive two frames $I_t$ and $I_{t+1}$ are shown, the reverse vector $-u_t$ of the backward motion vector and the forward motion vector $v_t$ are different from each other, and the difference therebetween is not "0" unlike the case of FIG. 2A.

The calculation result value of the first difference function D1 being small with respect to the forward motion vector and the backward motion vector of one block means that movement of the block between the consecutive two frames can be easily estimated from a motion vector of a previous frame as shown in FIG. 2A and the accuracy of the estimation is high. However, the calculation result value of the first difference function D1 being large means that a size of a difference vector between the forward motion vector and the reverse vector of the backward motion vector is large and that the block is suddenly moved during the consecutive two frames. Thus, a degree of unreliability of the movement of the corresponding object during an consecutive frame may be obtained from the calculation result of the first difference function with respect to the forward motion vector and the backward motion vector, and whether the position of the block in the current frame can be easily estimated from the motion vector of the previous frame may be determined.

The unreliability U is calculated using the result value of the calculated first difference function. For example, the unreliability may be represented as the following Equation 2.

$$U = L(D_1(v,u)) \quad \text{[Equation 2]}$$

Here, U denotes unreliability, v denotes a forward motion vector, u denotes a backward motion vector, and L denotes a linear or nonlinear function.

The linear or nonlinear function is a function of mapping the result value of the calculated first difference function on a value of unreliability, and the calculation result of the linear or nonlinear function L also outputs an increasing value as the result value of the calculated first difference function is increased. Thus, the calculation result of the linear or nonlinear function is also increased along with an increase in the calculation result of the first difference function D input as a factor, and therefore it is possible to determine the unreliability of the motion vector using the result value.

That is, when the value of the unreliability U obtained by calculating such a liner or nonlinear function is high, this means that it is not easy to determine which position the block is moved to in the next frame, from the motion vector of the moving block in the current frame. Thus, it is not easy to determine which position the object is moved to in the next frame, and it can be seen that there is sudden scene change or sudden movement of the corresponding object.

As another example, when a value of the first difference function D1 is input in the linear or nonlinear function L whose function value is reduced along with an increase in the input result value of the first difference function, the calculation result of the linear or nonlinear function L is reduced along with an increase in the value of the first difference function D1 input as a factor, and therefore the unreliability of the motion vector may be determined using the equation 2.

Thus, this means that it is easy to determine which position the object is moved to in the next frame, from the motion vector of the block included in the moving object in the current frame.

Hereinafter, the unreliability will be described according to the example. However, this is merely for easy understanding, and it should be understood that the technical concept of unreliability obviously includes concept of reliability.

As another example of calculating the unreliability U, a forward motion vector and a backward motion vector are obtained on consecutive two frames with respect to a block whose unreliability is to be measured and neighboring blocks thereof, and the first difference function D1 is calculated using the obtained forward motion vector and backward motion vector.

Next, by assigning varied weighting constants to the calculation result of the first difference function D1 according to whether the corresponding block is a block included within a distance in an image from a current target block and/or within the same object as that of the current target block, a weighted average is calculated, and a value of the unreliability U is obtained by performing a predetermined operation on the calculation result. According to the present embodiment, this may be represented as the following Equation 3.

$$U = L\left(\frac{1}{N}\sum_{j \in W} \alpha_j D_1(v_j, u_j)\right) \quad \text{[Equation 3]}$$

Here, U denotes unreliability, a denotes a weighting coefficient, v denotes a forward motion vector, u denotes a backward motion vector, W denotes a region, N denotes the number of blocks included in the region.

According to the present embodiment, as a forward motion vector and a backward motion vector extracted from a region including the object and also an adjacent region of the object is used in calculation, the result is obtained by reflecting movement of the adjacent blocks as well as a single block to be calculated, thereby obtaining a value of unreliability having high reliability.

According to another embodiment, the unreliability can be calculated from pixel difference information between two frames. The motion vector may be obtained on consecutive two frames with respect to the block included in the region including the object and the adjacent region of the object, and a pixel difference between the corresponding block and the block indicated by the motion vector in the previous frame is calculated, thereby calculating unreliability.

Further, by assigning a weighting coefficient to the calculated pixel difference according to whether the corresponding region is a region included in the object or a region not included in the object, a weighted average may be calculated, and by performing calculation of a predetermined linear function or nonlinear function with respect to the calculation result, the value of unreliability U may be obtained.

Figure 3:
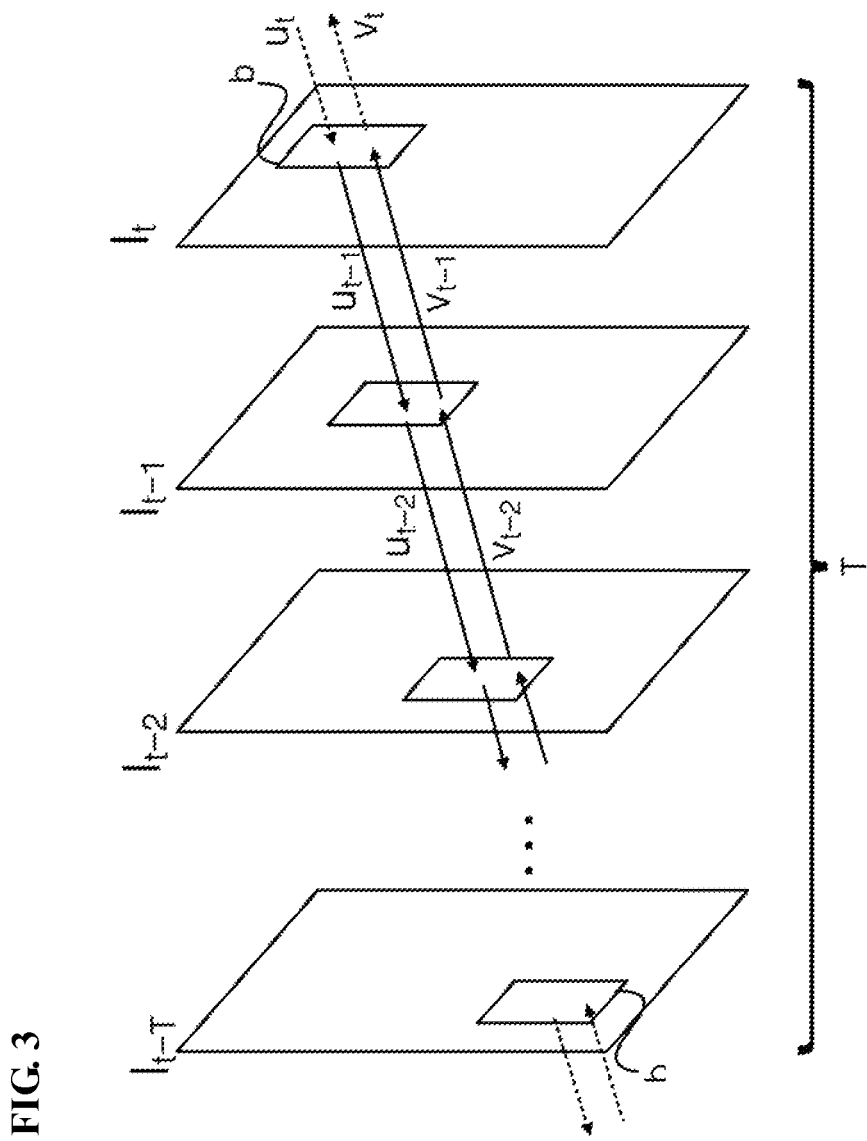
FIG. 3 illustrates an example of a forward motion vector and a backward motion vector of a block b during a predetermined time interval T.

Next, in operation S200, discontinuity D of the object is calculated during a predetermined time. FIG. 3 illustrates an example of a forward motion vector and a backward motion vector of a block b during a predetermined time interval T. Referring to FIG. 3, a difference between the forward motion vector of the block b and a reverse vector of the backward motion vector of the block b on any consecutive two frames within the time interval T is not large. That is, the block b is continuously moved within a predictable range using the motion vector and the like within the predetermined interval T, and the deviation of the movement change is not large. Discontinuity of the object that continuously moves during a predetermined time interval is quantified as discontinuity D, and the quantified discontinuity D is used in determination of a fallback level.

Hereinafter, the discontinuity will be described according to the example. However, this is merely for easy understanding, and it should be understood that the technical concept of discontinuity obviously includes concept of continuity.

Hereinafter, a method of calculating discontinuity according to the example will be described with reference to FIGS. 4 to 6.

Figure 4:
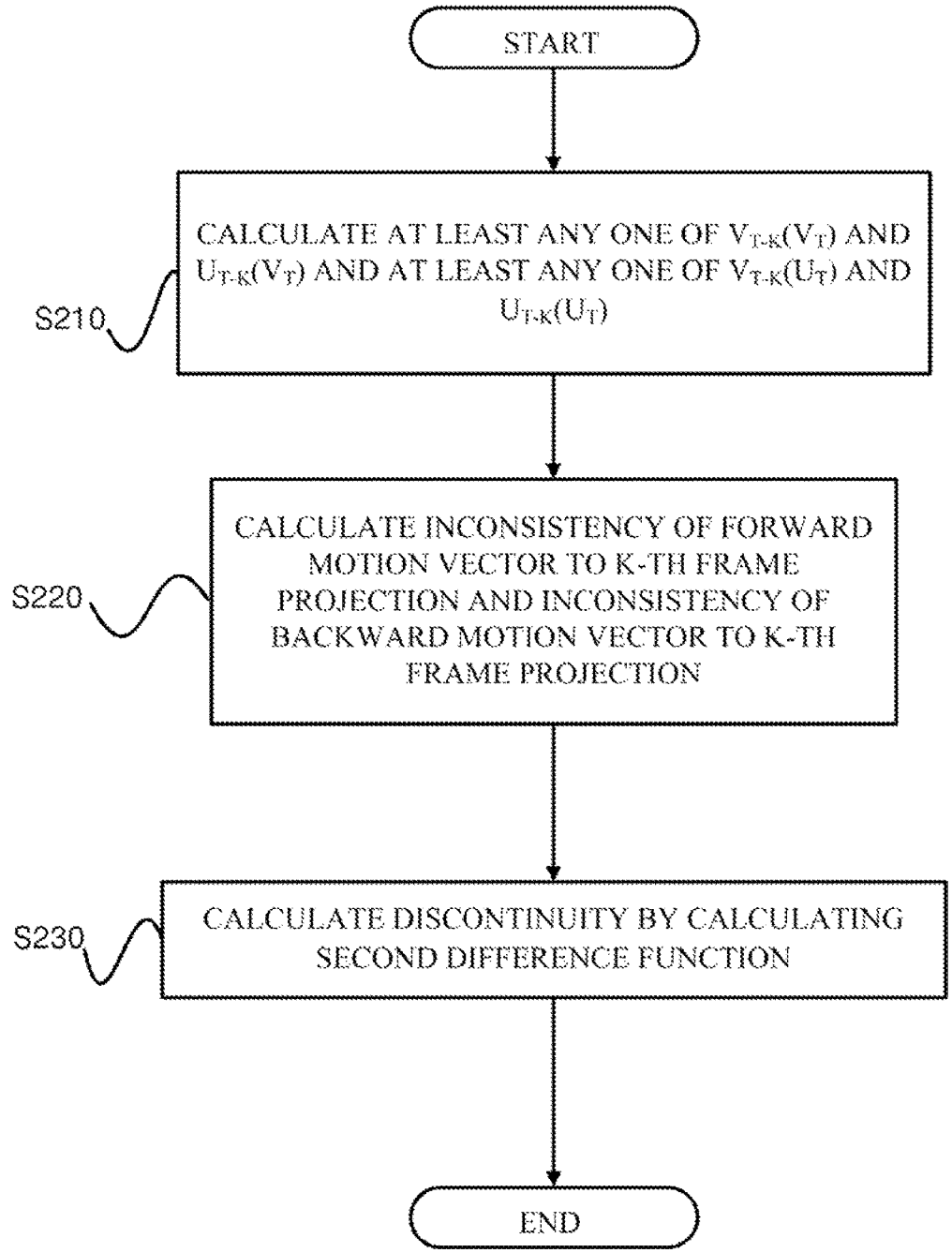
FIG. 4 is a flowchart illustrating an example of a method of calculating discontinuity of a motion vector.

FIG. 4 is a flowchart illustrating an example of a method of calculating discontinuity of a motion vector.

Figure 5A:
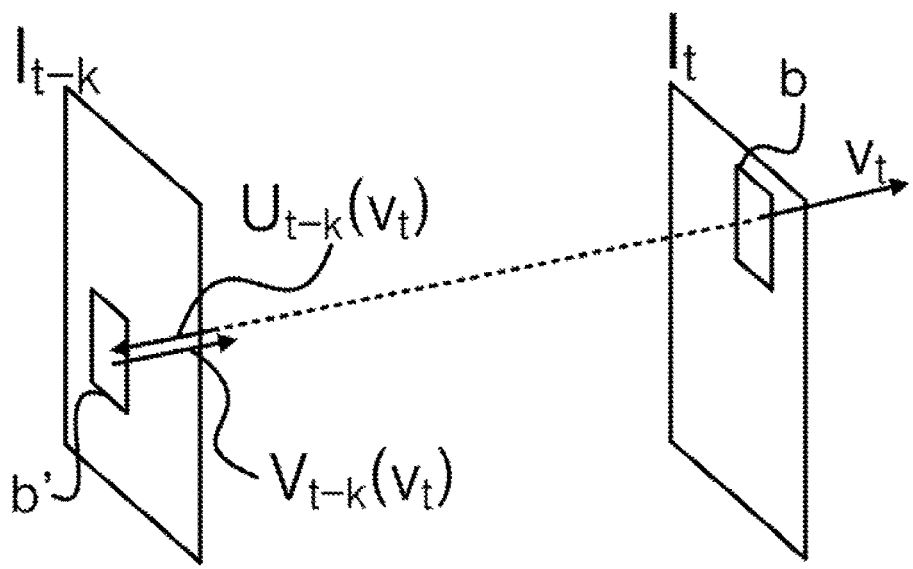
FIG. 5A illustrates an example of a k-th projected forward motion vector by a forward motion vector, a k-th projected backward motion vector by a forward motion vector.
Figure 5B:
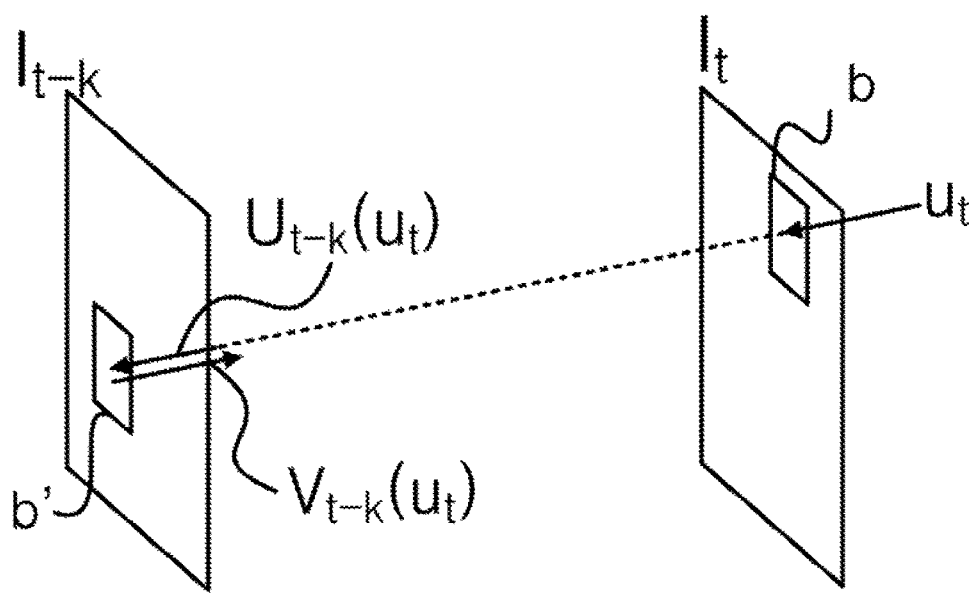
FIG. 5B illustrates an example of a k-th projected forward motion vector by a backward motion vector, and a k-th projected backward motion vector by a backward motion vector.

FIG. 5A illustrates an example of a k-th projected forward motion vector by a forward motion vector, a k-th projected backward motion vector by a forward motion vector. And FIG. 5B illustrates an example of a k-th projected forward motion vector by a backward motion vector, and a k-th projected backward motion vector by a backward motion vector.

Figure 6A:
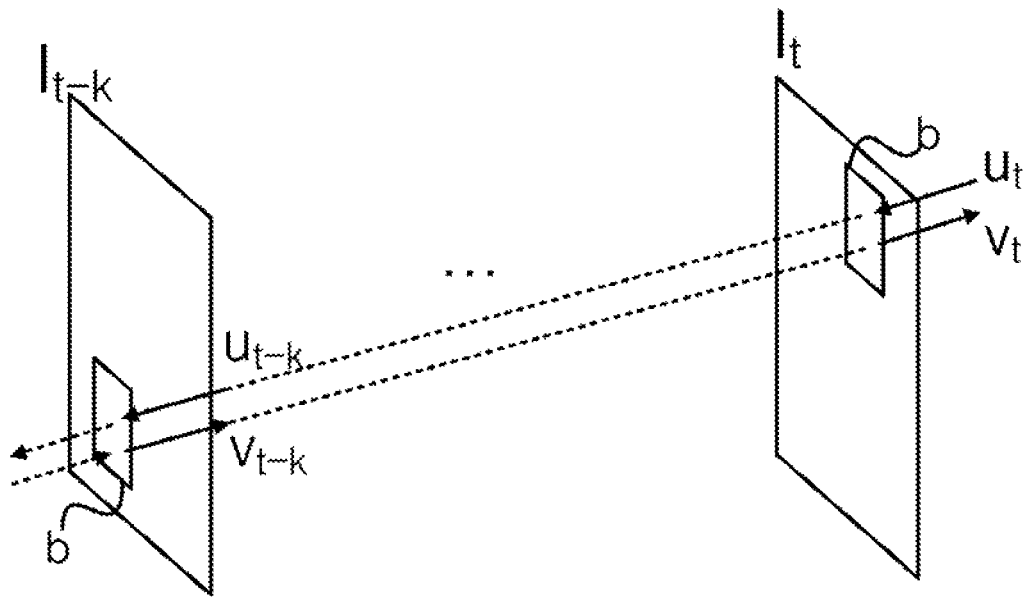
FIG. 6A illustrates a case in which a block is moved continuously and FIG. 6B illustrates a case in which a block is moved discontinuously.
Figure 6B:
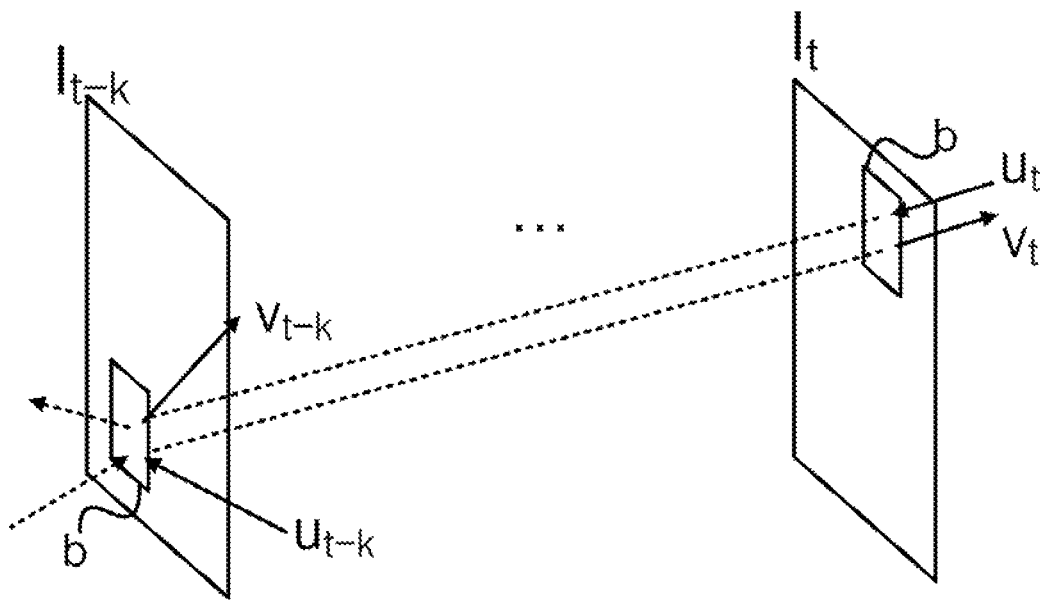

FIG. 6A illustrates a case in which a block is moved continuously and FIG. 6B illustrates a case in which a block is moved discontinuously.

Referring to FIGS. 4 and 5a, in operation S210, at least any one of the k-th projected forward motion vector $V_{t-k}(v_t)$ by the forward motion vector and the k-th projected backward motion vector $U_{t-k}(v_t)$ by the forward motion vector and at least any one of the k-th projected forward motion vector $V_{t-k}(u_t)$ by the backward motion vector and the k-th projected backward motion vector $U_{t-k}(u_t)$ by the backward motion vector are obtained.

In a current frame $I_t$, a forward motion vector $v_t$ of any block b is projected onto a past k-th frame $I_{t-k}$, a forward motion vector of a block b' positioned on an extended projection as shown by the dotted line is referred to as a k-th projected forward motion vector $V_{t-k}(v_t)$ by a forward motion vector, and a backward motion vector thereof is referred to as a k-th projected backward motion vector $U_{t-k}(v_t)$ by a forward motion vector. Similarly, referring to FIG. 5B, in the current frame $I_t$, a backward motion vector $u_t$ of any block b is projected onto a past k-th frame $I_{t-k}$, a forward motion vector of a block b' positioned on an extended projection as shown by the dotted line is referred to as a k-th projected forward motion vector $V_{t-k}(u_t)$ by a backward motion vector and a backward motion vector thereof is referred to as a k-th projected backward motion vector $U_{t-k}(u_t)$ by a backward motion vector.

In operation S220, a first difference function D1 is calculated using at least any one of the forward motion vector $v_t$ in the current frame, the k-th projected forward motion vector $V_{t-k}(v_t)$ by the forward motion vector, and the k-th projected backward motion vector $U_{t-k}(v_t)$ by the forward motion vector, thereby obtaining inconsistency of forward motion vector to k-th frame projection. As an example, when obtaining the inconsistency $D_{M,t-k}(v_t)$ of forward motion vector to k-th frame projection using the forward motion vector $v_t$ in the current frame and the k-th projected forward motion vector $V_{t-k}(v_t)$ by the forward motion vector, the following Equation 4 is used.

$$D_{M,t-k}(v_t)=M1(D1(v_t,V_{t-k}(v_t))) \quad \text{[Equation 4]}$$

Here, M1 denotes a first mapping formula, and D1 denotes a first difference function.

As another example, when obtaining inconsistency of forward motion vector to k-th frame projection using the forward motion vector $v_t$ in the current frame and the k-th projected backward motion vector $U_{t-k}(v_t)$ by the forward motion vector, the following Equation 5 is used. The first mapping formula M1 is an operation expression that maps an input result value to a result value equal to or different from the input result value. As an example, the first mapping formula M1 may be an operation expression in which the result value of the first mapping formula is increased along with an increase in a value input to the first mapping formula, and as another example, the first mapping formula M1 may be an operation expression that outputs the same value as the input value. In addition, when a case in which a plurality of result values a, b, and c are input to the first mapping formula is represented as M1 (a, b, c), the first mapping formula may be an expression that calculates any one of a minimum value, a maximum value, an arithmetic mean value, a geometric mean value, a weighted average value, a sum, a weighted sum, a median, and a mode with respect to a, b, and c.

As another example, the first mapping formula may be an operation expression in which the result value of the first mapping formula is increased along with a reduction in the input value. Using such a first mapping formula whose result value is increased along with the reduction in the input value, consistency of forward motion vector to k-th frame projection or consistency of backward motion vector to k-th frame projection may be obtained.

$$D_{M,t-k}(v_t)=M1(D1(v_t,U_{t-k}(v_t))) \quad \text{[Equation 5]}$$

Here, M1 denotes a first mapping formula, and D1 denotes a first difference function.

As another example, when obtaining inconsistency of forward motion vector to k-th frame projection using the forward motion vector $v_t$ in the current frame, the k-th projected forward motion vector $V_{t-k}(v_t)$ by the forward motion vector, and the k-th projected backward motion vector $U_{t-k}(v_t)$ by the forward motion vector, the following Equation 6 is used.

$$D_{M,t-k}(v_t)=M1(D1(V_{t-k}(v_t),U_{t-k}(v_t)),D1(v_t,V_{t-k}(v_t)),D1(v_t,U_{t-k}(v_t))) \quad \text{[Equation 6]}$$

As described above, the first mapping formula M1 may include a process of calculating any one of a minimum value, a maximum value, an arithmetic mean value, a geometric mean value, a weighted average value, a sum, a weighted sum, a median, and a mode with respect to a, b, and c. Inconsistency of forward motion vector to k-th frame projection could be calculated using M1.

In addition, when obtaining inconsistency of backward motion vector to k-th frame projection using the backward motion vector $u_t$ in the current frame and the k-th projected forward motion vector $V_{t-k}(u_t)$ by the backward motion vector, the following Equation 7 is used.

$$D_{M,t-k}(u_t)=M1(D1(u_t,V_{t-k}(u_t))) \quad \text{[Equation 7]}$$

Here, M1 denotes a first mapping formula, and D1 denotes a first difference function.

As another example, when obtaining inconsistency $D_{M,t-k}(u_t)$ of backward motion vector to k-th frame projection using the backward motion vector $u_t$ in the current frame and the k-th projected backward motion vector $U_{t-k}(u_t)$ by the backward motion vector, the following Equation 8 is used.

$$D_{M,t-k}(u_t)=M1(D1(u_t,U_{t-k}(u_t))) \quad \text{[Equation 8]}$$

Here, M1 denotes a first mapping formula, and D1 denotes a first difference function.

As another example, when obtaining inconsistency of backward motion vector to k-th frame projection using the backward motion vector in the current frame $u_t$, the k-th projected forward motion vector $V_{t-k}(u_t)$ by the backward motion vector, and the k-th projected backward motion vector $U_{t-k}(u_t)$ by the backward motion vector, the following Equation 9 is used.

$$D_{M,t-k}(u_t)=M1(D1(V_{t-k}(u_t),U_{t-k}(u_t)),D1(u_t,V_{t-k}(u_t)),D1(u_t,U_{t-k}(u_t))) \quad \text{[Equation 9]}$$

As an example, in an example represented by Equations 6 and 9, when the first mapping formula M1 is an expression that performs a weighted sum operation, inconsistency $D_{M,t-k}(v_t)$ of forward motion vector to k-th frame projection and inconsistency $D_{M,t-k}(u_t)$ of backward motion vector to k-th frame projection may be represented as the following Equation 10.

$$D_{M,t-k}(v_t)=m_{v,1}D1(V_{t-k}(v_t),U_{t-k}(v_t))+m_{v,2}D1(v_t,V_{t-k}(v_t))+m_{v,3}D1(v_t,U_{t-k}(v_t))$$

$$D_{M,t-k}(u_t)=m_{u,1}D1(V_{t-k}(u_t),U_{t-k}(u_t))+m_{u,2}D1(u_t,V_{t-k}(u_t))+m_{u,3}D1(u_t,U_{t-k}(u_t))$$ [Equation 10]

Here, m denotes a variable or invariable weighting coefficient.

As an example, it is assumed that any block moves from the k-th previous frame which is a frame prior to the k-th frame starting from a current frame, to the current frame. In this instance, as shown in FIG. 6A, it is assumed as a first case that, in all frames after the k-th previous frame, the block moves so as to coincide with the direction of the forward motion vector of the block and reaches a current block position of the current frame, and in all frames from the current frame up to the k-th previous frame, the block moves so as to coincide with the direction of the backward motion vector of the block and reaches a corresponding block position in the k-th previous frame. In addition, as shown in FIG. 6B, it is assumed as a second case that, in all frames after the k-th previous frame, the block moves so as not to coincide with the direction of the forward motion vector of the block and reaches the current block position of the current frame, and in all frames prior to from the current frame up to the k-th previous frame, the block does not move so as to coincide with the direction of the backward motion vector of the block.

In the first case, as to the inconsistency $D_{M,t-k}(v_t)$ of forward motion vector to k-th projection frame, the forward motion vector $v_t$ in the current frame $I_t$ coincides with the k-th projected forward motion vector by the forward motion vector, and the forward motion vector $v_t$ also coincides with a reverse vector of the k-th projected backward motion vector by the forward motion vector. Thus, the result obtained by calculating the first difference function of the forward motion vector and the k-th projected forward motion vector by the forward motion vector is "0", the result obtained by calculating the first difference function of the forward motion vector and the k-th projected backward motion vector by the forward motion vector is also "0", and the result obtained by calculating the first difference function of the k-th projected forward motion vector by the forward motion vector and the k-th projected backward motion vector by the forward motion vector is also "0".

However, as to the second case shown in FIG. 6B, the forward motion vector $v_t$ in the current frame $I_t$ does not coincide with the k-th projected forward motion vector by the forward motion vector, and the forward motion vector $v_t$ does not coincide with a reverse vector of the k-th projected backward motion vector by the forward motion vector. Thus, the calculation result of the first difference function of the forward motion vector and the k-th projected forward motion vector by the forward motion vector is not "0". In addition, the calculation result of the first difference function of the forward motion vector and the k-th projected backward motion vector by the forward motion vector is not "0" either, and likewise, the calculation result of the first difference function of the k-th projected forward motion vector by the forward motion vector and the k-th projected backward motion vector by the forward motion vector is not "0".

Therefore, when obtaining the inconsistency $D_{M,t-k}(v_t)$ of forward motion vector to k-th frame projection using the first mapping formula, the result value obtained by calculating the inconsistency $D_{M,t-k}(v_t)$ of forward motion vector to k-th frame projection in the first case is smaller than the result value of the second case, and the fact that values of inconsistency $D_{M,t-k}(v_t)$ from first frame projection to k-th frame projection of the forward motion vector are successively smaller than the result value of the second case means that the block relatively continuously moves from the k-th previous frame to the current frame.

Similarly, even though inconsistency $D_{M,t-k}(u_t)$ of backward motion vector to k-th frame projection in each of the first and second cases is calculated, the backward motion vector $u_t$ of the current frame coincides with the k-th projected forward motion vector by the backward motion vector as shown in FIG. 5A and the forward motion vector $v_t$ coincides with a reverse vector of the k-th projected backward motion vector by the forward motion vector, and therefore the result value of the first case is smaller than that of the second case. Thus, the fact that values of inconsistency $D_{M,t-k}(u_t)$ from first frame projection to k-th frame projection of the backward motion vector are successively smaller than the result value of the second case means that the block relatively continuously moves from the current frame to the k-th previous frame.

Next, using the obtained inconsistency $D_{M,t-k}(v_t)$ of forward motion vector to k-th frame projection and inconsistency $D_{M,t-k}(u_t)$ of backward motion vector to k-th frame projection, a second difference function D2 is calculated. Second and third mapping formulas M2 and M3 shown in the following Equation 11 may be an expression that calculates any one of a minimum value, a maximum value, an arithmetic mean value, a geometric mean value, a weighted average value, a sum, a weighted sum, a median, and a mode.

$$D2(v_t,u_t,k)=M3(M2(D_{M,t}(v_t),D_{M,t-1}(v_t),\ldots,D_{M,t-k}(v_t)),M2(D_{M,t}(u_t),D_{M,t-1}(u_t),\ldots,D_{M,t-k}(u_t)))$$

$$D2(v_t,u_t,0)=D1(v_t,u_t)$$ [Equation 11]

In an example in which the second mapping formula M2 is defined as a maximum value function, the second difference function D2 may be calculated in such a manner that a maximum value is selected among inconsistency of forward motion vector to first frame projection, inconsistency of forward motion vector for second frame projection, inconsistency of forward motion vector for third frame projection, . . . , and inconsistency of forward motion vector for k-th frame projection, a maximum value is selected among inconsistency of backward motion vector for first frame projection, inconsistency of backward motion vector for second frame projection, inconsistency of backward motion vector for third frame projection, . . . , and inconsistency of backward motion vector for k-th frame projection, and the selected maximum values are input to the third mapping formula M3.

As described above, the value of projection inconsistency which is calculated when the block moves unreliably and discontinuously as shown in FIG. 6B is larger than the value calculated when the block moves reliably and continuously as shown in FIG. 6A. In addition, the above-described second difference function is an equation having a structure in which the values of projection inconsistency when the block moves unreliably and discontinuously are reflected definitively in calculation of the result value, and may determine continuity and reliability of the block from the current frame to the k-th frame from the result obtained by calculating the second difference function.

In operation S230, discontinuity is calculated using the result value of the second difference function D2. According to an embodiment, discontinuity may be represented as the following Equation 12.

$$D=L(M(D2(v_t,u_t,0),D2(v_t,u_t,1),D2(v_t,u_t,2),\ldots,D2(v_t,u_t,T)))$$ [Equation 12]

Here, D denotes discontinuity, M denotes a mapping formula, and L denotes a linear or nonlinear function.

As an example, when the mapping formula M is a formula for obtaining a weighted sum, and uses, as discontinuity, a value using a predetermined linear or nonlinear function with respect to the calculated result, discontinuity D may be represented as the following Equation 13.

$$D = L(\mu_t D2(v_t, u_t, 0) + \mu_{t-1} D2(v_t, u_t, 1)°\mu_{t-2} D2(v_t, u_t, 2) + \ldots + \mu_{t-T} D2(v_t, u_t, T))$$ [Equation 13]

Here, D denotes discontinuity, u denotes a weighting coefficient, and L denotes a linear or nonlinear function.

The discontinuity may refer to a total value obtained by assigning again a predetermined weighting coefficient to the second difference function D2 obtained by performing a predetermined operation on maximum values of inconsistency of forward motion vector to k-th frame projection and inconsistency of backward motion vector to k-th frame projection for each interval at an interval between t and t−1, an interval between t and t−2, . . . , and an interval between t and t−T. The discontinuity is measured from similarity of motion vectors existing on an extension of the motion vector $v_t$ during a predetermined time interval T.

As to Equation 12 that defines the discontinuity D, $D2(v_t, u_t, 0)$ that is the calculation result of the second difference function at the latest interval is involved in $D2(v_t, u_t, 1)$, $D2(v_t, u_t, 2), \ldots,$ and $D2(v_t, u_t, T)$ (see Equations 11 and 12), and commonly affects all of the terms of Equation 12. That is, in a case in which the second mapping formula M2 of Equation 11 is defined as a maximum value function, when the calculation result value of $D2(v_t, u_t, 0)$ is larger than the result value at a different interval, the result value of Equation 12 is calculated larger, and therefore the value of discontinuity is resultingly calculated to be a higher value when the block moves unreliably at the latest interval.

When the block has uniform motion properties at continuous observation intervals as shown in FIG. 3, the value of discontinuity D is calculated to be a lower value. That is, the value of discontinuity D is calculated to be the lower value as the block moves reliably at the latest interval, and is calculated to be the higher value as the block moves unreliably at the latest interval.

However, in a case in which an output function value is reduced as a value input to the linear or nonlinear function is increased, the linear or nonlinear functions may be set in such a manner that the value of discontinuity D is calculated to be the higher value as the block moves reliably, and calculated to be the lower value as the block moves unreliably at the latest interval. In this case, the output values of the linear or nonlinear functions may be called continuity rather than discontinuity. However, as described above, it should be understood that the technical concept of discontinuity which has been described in the present embodiment obviously includes concept of continuity.

Referring again to FIG. 1, in operation S300, a fallback level is calculated using the calculated unreliability U and discontinuity D. The fallback level means a value that determines a degree of fallback to be performed on image area or moving objects. According to an embodiment, the fallback level is calculated using unreliability U and discontinuity D. In a case in which the value of unreliability U and the value of discontinuity D are designed to be calculated higher as the motion vector is uniform and reliable at intervals of the current frame and continuous frames, the following Equation 14 for calculating the fallback level is used.

$$F(b_i) = L(U(b_i) + \lambda D(bi))$$ [Equation 14]

Here, F denotes a fallback level, λ denotes a weighting coefficient, and L denotes a linear or nonlinear function.

In Equation 14, a predetermined weighting coefficient as a control means for appropriately adjusting the ratio of the calculated values of unreliability U and discontinuity D is multiplied to the ratio and the obtained value is substituted with the linear/nonlinear function L, thereby calculating the fallback level F. A system is configured in such a manner that the fallback is more strongly applied as the fallback level F is calculated higher, thereby outputting an image not related to motion compensation. In addition, the system is configured in such a manner that the fallback is more slightly applied as the fallback level F is calculated lower, thereby outputting an image generated by the motion compensation.

As another embodiment that determines the fallback level by applying equations of adding unreliability and discontinuity, characteristics of the block are classified in advance based on the unreliability and discontinuity, and the degree of density of the classified characteristics is examined to determine the fallback level.

Figure 7:
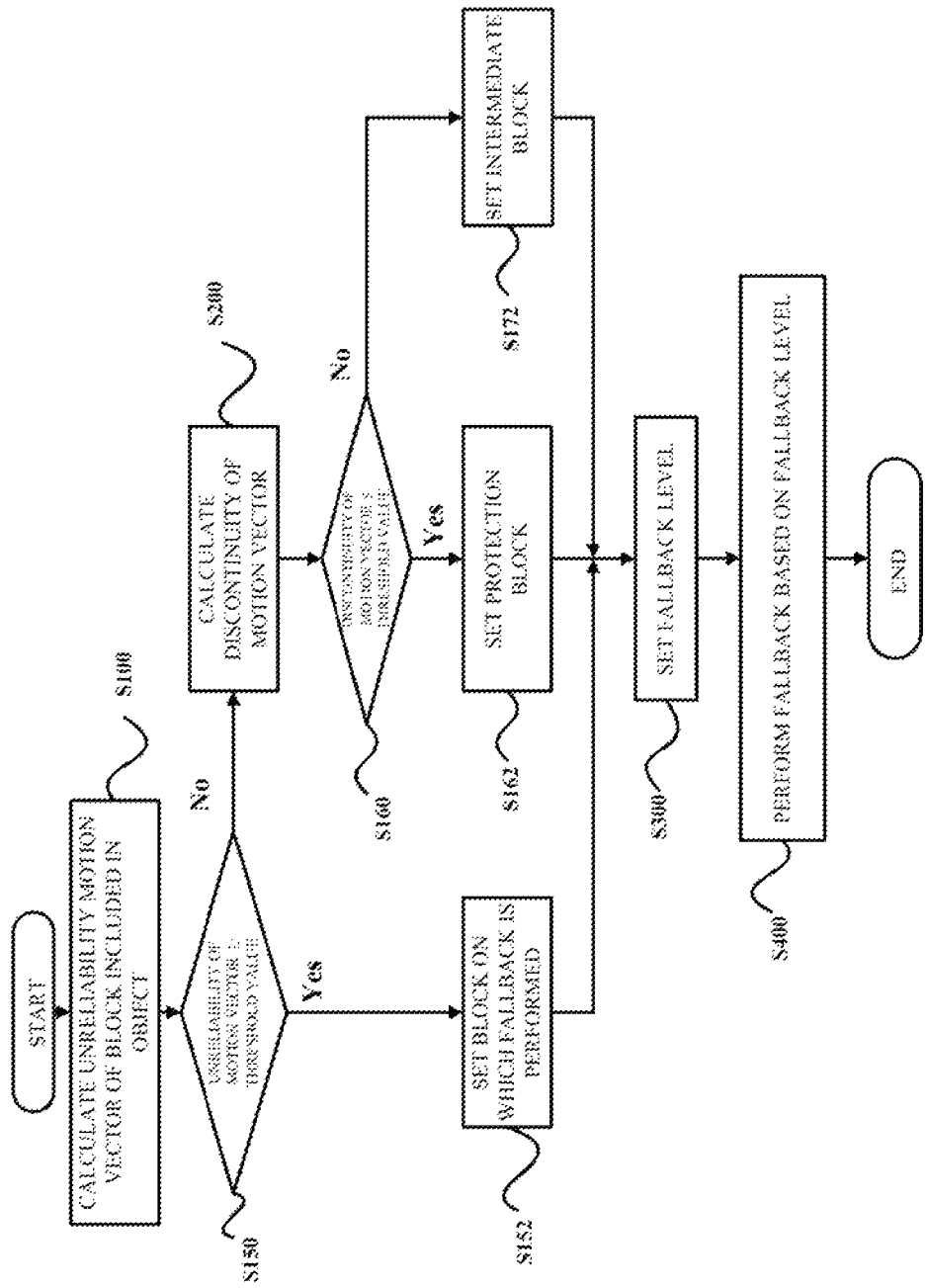
FIG. 7 is a flowchart illustrating an example of a process of performing fallback by classifying a block using unreliability and discontinuity.

FIG. 7 is a flowchart illustrating an example of a process of performing fallback by classifying a block using unreliability and discontinuity of the motion vector. FIG. 7 is a diagram for describing each operation of the embodiment in which the block is classified using unreliability and discontinuity and fallback is performed using the classified block. Referring to FIG. 7, according to an embodiment, the fallback level is calculated using the block classified using unreliability and discontinuity. In operation S150, the unreliability U of the calculated motion vector and a threshold value for unreliability are compared. When the unreliability U is the threshold value for unreliability or larger, it is determined that the corresponding block rapidly moves in a consecutive frame, and therefore the corresponding block is classified as a block on which fallback should be performed in operation S152. However, when the unreliability is less than the threshold value for unreliability, discontinuity of the corresponding block is calculated in operation S200, and the calculated discontinuity D and a threshold value for discontinuity are compared in operation S160. A block whose discontinuity is to be calculated is the unreliability is determined to be less than the threshold value for unreliability in operation S150, and thereby is not the block included in a rapidly moving object between consecutive frames. However, in terms of whether fallback is applied, in a case in which the corresponding block is a block that continuously moves during a predetermined time interval (see T of FIG. 3), application of fallback to the corresponding block causes a problem of a reduction in image quality due to the fallback process, and thereby is not desirable.

In operation S160, discontinuity of the motion vector and a threshold value for discontinuity are compared. When the discontinuity of the motion vector is the threshold value for discontinuity or less based on the comparison result, it may be determined that the corresponding block continuously moves within a predetermined range during a predetermined time interval (see T of FIG. 3), and therefore it is not desirable to perform fallback on the corresponding block. As a result, in operation S162, the corresponding block is set as a fallback protection block that should be excluded as much as possible from the fallback process. However, when the discontinuity of the block exceeds the threshold value for discontinuity based on the determination result in operation S160, the corresponding block is classified as an intermediate block in operation S172.

According to an embodiment, the fallback level may be calculated using the classification results together with the unreliability U and discontinuity D. As an example, when the blocks included in the object are classified as the block on which fallback is to be performed, the fallback protection block, or the intermediate block, the number of blocks on which fallback is to be performed and the number of fallback protection blocks are counted, respectively. When the number of blocks on which fallback is to be performed is A and the number of fallback protection blocks is S, the fallback level may be calculated as shown in the following Equation 15.

$$F(b_i)=L(A-\gamma S) \qquad \text{[Equation 15]}$$

Here, F denotes a fallback level, L denotes a linear or nonlinear function, γ denotes a weighting coefficient, A denotes the number of blocks on which fallback is to be performed, and S denotes the number of fallback protection blocks.

That is, a predetermined weighting coefficient as a control means for appropriately adjusting a ratio of the number of blocks on which fallback is to be performed and the number of fallback protection blocks which are included in the object is multiplied to the ratio, and a predetermined calculation is performed on the difference value, thereby determining the fallback level. The linear or nonlinear function L in Equation 15 is defined in such a manner that the result value of the linear or nonlinear function L is increased along with an increase in an input value, the calculation result value of the fallback level is increased along with an increase in the number A of blocks on which fallback is to be performed, and reduced along with an increase in the number S of fallback protection blocks.

As another example, when the number of blocks on which fallback is to be performed is A and the number of fallback protection blocks is S, the fallback level may be calculated as shown in the following Equation 16.

$$F(b_i) = L\left(\delta \frac{A}{S}\right) \qquad \text{[Equation 16]}$$

Here, F denotes a fallback level, L denotes a linear or nonlinear function, γ denotes a weighting coefficient, A denotes the number of blocks on which fallback is to be performed, and S denotes the number of fallback protection blocks.

That is, a predetermined weighting coefficient is multiplied to the ratio of the number of blocks on which fallback is to be performed and the number of fallback protection blocks which are included in the object, and a predetermined calculation is performed on the obtained value, thereby determining the fallback level.

In operation S400, fallback is performed based on the calculated fallback coefficient. According to an embodiment, an image is formed by adjusting a synthesis ratio between an image formed by motion estimation and motion compensation according to the calculated fallback level value and the previous frame. When the values of discontinuity D of the blocks included in the object are small or values of blocks classified as the fallback protection block among the blocks included in the object are large, the calculated fallback level value according to the above-described embodiments is calculated to be small, and an image of the corresponding object is formed in such a manner that the ratio of the image formed by motion estimation and motion compensation is higher than the ratio of the fallback image. However, in contrast, when the values of unreliability U of the blocks included in the object are large or the number of blocks classified as the block on which fallback is to be performed among the blocks included in the object is larger than the number of blocks which are not classified as the block on which fallback is to be performed, the fallback level value of the corresponding object is high. Thus, fallback is highly applied to such an object.

According to the present embodiment, the fallback level that is the fallback application standard may be calculated using mutually different two standards of unreliability and discontinuity, and therefore fallback may be prevented from being applied to the continuously moving object during several frames to thereby prevent a reduction in the image quality to be displayed while maintaining constant image quality by performing fallback on the rapidly moving object. Even when global fallback is applied or scene change occurs, by preventing fallback process on a partial region of the image which continuously and uniformly moves even in the corresponding frame interval such as subtitles which are included in the image and move in horizontal and vertical directions, a more natural screen interpolation method in a frame rate conversion system may be provided.

As described above, by the method of calculating discontinuity of the motion vector according to the example, discontinuity of the motion vector included in the frame may be calculated, and discontinuity of motion of the block included in the object may be quantitatively measured and determined using the calculated discontinuity of the motion vector.

According to the example, the fallback level may be calculated using unreliability and discontinuity and fallback may be performed using the fallback level, and therefore fallback may be performed on the rapidly moving object and the continuously moving object using mutually different fallback levels, or fallback may not be performed on the continuously moving object to prevent the reduction in the displayed image quality.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of calculating discontinuity of a motion vector, comprising:
   obtaining, by circuitry, at least any one of a k-th projected forward motion vector (k being a natural number) by a forward motion vector of a block and a k-th projected backward motion vector by the forward motion vector and at least any one of a k-th projected forward motion vector by a backward motion vector and a k-th projected backward motion vector by the backward motion vector;
   obtaining, by the circuitry, inconsistency of forward motion vector to k-th frame projection and inconsistency of backward motion vector to k-th frame projection by calculating, by the circuitry, a first difference function using at least any one of the forward motion vector, the k-th projected forward motion vector by the forward motion vector, and the k-th projected backward motion vector by the forward motion vector and calculating, by the circuitry, the first difference function using at least any one of the backward motion vector, the k-th projected forward motion vector by the backward motion vector, and the k-th projected backward motion vector by the backward motion vector;

calculating, by the circuitry, discontinuity using the inconsistency of forward motion vector to k-th frame projection and the inconsistency of backward motion vector to k-th frame projection, wherein the obtaining of the inconsistency of forward motion vector to k-th frame projection is performed by calculating at least any one of $$D_{M,t-k}(v_t)=M1(D1(v_t,V_{t-k}(v_t)))$$

$$D_{M,t-k}(v_t)=M1(D1(v_t,U_{t-k}(v_t))), \text{ and}$$

$$D_{M,t-k}(v_t)=M1(D1(V_{t-k}(v_t),U_{t-k}(v_t)),D1(v_t,V_{t-k}(v_t)),D1(v_t,U_{t-k}(v_t)))),$$

where $D_{M,t-k}(v_t)$ denotes the inconsistency of forward motion vector to k-th frame projection, M1 denotes a first mapping formula, D1 denotes the first difference function, $v_t$ denotes the forward motion vector, $V_{t-k}(v_t)$ denotes the k-th projected forward motion vector by the forward motion vector, and $U_{t-k}(v_t)$ denotes the k-th projected backward motion vector by the forward motion vector, and wherein the calculated discontinuity is used to determine whether to perform fallback and calculate a fallback level used to perform the fallback according to a result of the determination; and outputting, by the circuitry, an image with minimized degradation based on the fallback level.

2. The method of calculating discontinuity of a motion vector of claim 1, wherein the obtaining of the k-th projected forward motion vector by the forward motion vector includes projecting a forward motion vector of a block included in a current frame onto a past k-th frame and obtaining a forward motion vector of a block positioned on an extended projection, the obtaining of the k-th projected backward motion vector by the forward motion vector includes projecting the forward motion vector of the block included in the current frame onto the past k-th frame and obtaining a backward motion vector of the block positioned on the extended projection, the obtaining of the k-th projected forward motion vector by the backward motion vector includes projecting a backward motion vector of the block included in the current frame onto the past k-th frame and obtaining the forward motion vector of the block positioned on the extended projection, and the obtaining of the k-th projected backward motion vector by the backward motion vector includes projecting the backward motion vector of the block included in the current frame onto the past k-th frame and obtaining the backward motion vector of the block positioned on the extended projection.

3. The method of calculating discontinuity of a motion vector of claim 1, wherein the obtaining of the inconsistency of backward motion vector to k-th frame projection is performed by calculating at least any one of $$D_{M,t-k}(u_t)=M1(D1(u_t,V_{t-k}(u_t))),$$

$$D_{M,t-k}(u_t)=M1(D1(u_t,U_{t-k}(u_t))), \text{ and}$$

$$D_{M,t-k}(u_t)=M1(D1(V_{t-k}(u_t),U_{t-k}(u_t)),D1(u_t,V_{t-k}(u_t)),D1(u_t,U_{t-k}(u_t))),$$

where $D_{M,t-k}(u_t)$ denotes the inconsistency of backward motion vector to k-th frame projection, M1 denotes a first mapping formula, D1 denotes the first difference function, $u_t$ denotes the backward motion vector, $V_{t-k}(u_t)$ denotes the k-th projected forward motion vector by the backward motion vector, and $U_{t-k}(u_t)$ denotes the k-th projected backward motion vector by the backward motion vector.

4. The method of calculating discontinuity of a motion vector of claim 1, wherein the first mapping formula M1 is a function that calculates any one of a minimum value, a maximum value, an arithmetic mean value, a geometric mean value, a weighted average value, a sum, a weighted sum, a median, and a mode with respect to factors input in the first mapping formula.

5. The method of calculating discontinuity of a motion vector of claim 1, wherein the calculating of the discontinuity includes calculating a second difference function using values of the inconsistency of forward motion vector to k-th frame projection calculated from a current frame to a k-th frame and values of the inconsistency of backward motion vector to k-th frame projection calculated from the current frame to the k-th frame.

6. The method of calculating discontinuity of a motion vector of claim 5, wherein the calculating of the second difference function includes calculating a first value that is any one of a maximum value, a minimum value, an arithmetic mean value, a geometric mean value, a weighted average value, a sum, a weighted sum, a median, and a mode of the values of the inconsistency of forward motion vector to k-th frame projection from the current frame to a frame prior to the k-th frame, calculating a second value that is any one of a maximum value, a minimum value, an arithmetic mean value, a geometric mean value, a weighted average value, a sum, a weighted sum, a median, and a mode of the values of the inconsistency of backward motion vector to k-th frame projection from the current frame to the k-th previous frame, and calculating any one of a maximum value, a minimum value, an arithmetic mean value, a geometric mean value, a weighted average value, a sum, a weighted sum, a median, and a mode of the first value and the second value.

7. The method of calculating discontinuity of a motion vector of claim 5, wherein the calculating of the second difference function is performed by calculating the following Equation:

$$D2(v_t,u_t,k)=M3(M2(D_{M,t}(v_t),D_{M,t-1}(v_t),\ldots,D_{M,t-k}(v_t)),M2(D_{M,t}(u_t),D_{M,t-1}(u_t),\ldots,D_{M,t-k}(u_t)))$$

$$D2(v_t,u_t,0)=D1(v_t,u_t)$$

where, D2 denotes the second difference function, $D_{M,t-k}(v_t)$ denotes the inconsistency of forward motion vector to k-th frame projection, $D_{M,t-k}(u_t)$ denotes the inconsistency of backward motion vector to k-th frame projection, v denotes the forward motion vector, u denotes the backward motion vector, k denotes a natural number, M2 denotes a second mapping formula, and M3 denotes a third mapping formula.

8. A method of calculating discontinuity of a motion vector comprising:

obtaining, by circuitry, at least any one of a k-th projected forward motion vector (k being a natural number) by a forward motion vector of a block and a k-th projected backward motion vector by the forward motion vector and at least any one of a k-th projected forward motion vector by a backward motion vector and a k-th projected backward motion vector by the backward motion vector;

obtaining, by the circuitry, inconsistency of forward motion vector to k-th frame projection and inconsistency of backward motion vector to k-th frame projection by calculating, by the circuitry, a first difference function using at least any one of the forward motion vector, the k-th projected forward motion vector by the forward motion vector, and the k-th projected backward motion vector by the forward motion vector and calculating, by the circuitry, the first difference function using at least any one of the backward motion vector, the k-th projected forward motion vector by the backward motion vector, and the k-th projected backward motion vector by the backward motion vector;

calculating, by the circuitry, discontinuity using the inconsistency of forward motion vector to k-th frame projection and the inconsistency of backward motion vector to k-th frame projection, wherein the calculating of the discontinuity includes calculating a second difference function using values of the inconsistency of forward motion vector to k-th frame projection calculated from a current frame to a k-th frame and values of the inconsistency of backward motion vector to k-th frame projection calculated from the current frame to the k-th frame, wherein the calculating of the second difference function is performed by calculating the following Equation:

$$D2(v_t, u_t, k) = M3(M2(D_{M,t}(v_t), D_{M,t-1}(v_t), \ldots, D_{M,t-k}(v_t)), M2(D_{M,t}(u_t), D_{M,t-1}(u_t), \ldots, D_{M,t-k}(u_t)))$$

$$D2(v_t, u_t, 0) = D1(v_t, u_t)$$

where, D2 denotes the second difference function, $D_{M,t-k}(v_t)$ denotes the inconsistency of forward motion vector to k-th frame projection, $D_{M,t-k}(u_t)$ denotes the inconsistency of backward motion vector to k-th frame projection, v denotes the forward motion vector, u denotes the backward motion vector, k denotes a natural number, M2 denotes a second mapping formula, and M3 denotes a third mapping formula, and wherein the calculated discontinuity is used to determine whether to perform fallback and calculate a fallback level used to perform the fallback according to a result of the determination; and outputting, by the circuitry, an image with minimized degradation based on the fallback level.

9. The method of calculating discontinuity of a motion vector of claim 8, wherein the obtaining of the k-th projected forward motion vector by the forward motion vector includes projecting a forward motion vector of a block included in a current frame onto a past k-th frame and obtaining a forward motion vector of a block positioned on an extended projection, the obtaining of the k-th projected backward motion vector by the forward motion vector includes projecting the forward motion vector of the block included in the current frame onto the past k-th frame and obtaining a backward motion vector of the block positioned on the extended projection, the obtaining of the k-th projected forward motion vector by the backward motion vector includes projecting a backward motion vector of the block included in the current frame onto the past k-th frame and obtaining the forward motion vector of the block positioned on the extended projection, and the obtaining of the k-th projected backward motion vector by the backward motion vector includes projecting the backward motion vector of the block included in the current frame onto the past k-th frame and obtaining the backward motion vector of the block positioned on the extended projection.

10. The method of calculating discontinuity of a motion vector of claim 8, wherein the obtaining of the inconsistency of backward motion vector to k-th frame projection is performed by calculating at least any one of $$D_{M,t-k}(u_t) = M1(D1(u_t, V_{t-k}(u_t))),$$

$$D_{M,t-k}(u_t) = M1(D1(u_t, U_{t-k}(u_t))), \text{ and}$$

$$D_{M,t-k}(u_t) = M1(D1(V_{t-k}(u_t), U_{t-k}(u_t)), D1(u_t, V_{t-k}(u_t)), D1(u_t, U_{t-k}(u_t))),$$

where $D_{M,t-k}(u_t)$ denotes the inconsistency of backward motion vector to k-th frame projection, M1 denotes a first mapping formula, D1 denotes the first difference function, $u_t$ denotes the backward motion vector, $V_{t-k}(u_t)$ denotes the k-th projected forward motion vector by the backward motion vector, and $U_{t-k}(u_t)$ denotes the k-th projected backward motion vector by the backward motion vector.

11. The method of calculating discontinuity of a motion vector of claim 8, wherein the first mapping formula M1 is a function that calculates any one of a minimum value, a maximum value, an arithmetic mean value, a geometric mean value, a weighted average value, a sum, a weighted sum, a median, and a mode with respect to factors input in the first mapping formula.

12. The method of calculating discontinuity of a motion vector of claim 8, wherein the calculating of the second difference function includes calculating a first value that is any one of a maximum value, a minimum value, an arithmetic mean value, a geometric mean value, a weighted average value, a sum, a weighted sum, a median, and a mode of the values of the inconsistency of forward motion vector to k-th frame projection from the current frame to a frame prior to the k-th frame, calculating a second value that is any one of a maximum value, a minimum value, an arithmetic mean value, a geometric mean value, a weighted average value, a sum, a weighted sum, a median, and a mode of the values of the inconsistency of backward motion vector to k-th frame projection from the current frame to the k-th previous frame, and calculating any one of a maximum value, a minimum value, an arithmetic mean value, a geometric mean value, a weighted average value, a sum, a weighted sum, a median, and a mode of the first value and the second value.

13. A method of calculating discontinuity of a motion vector, comprising:

obtaining, by circuitry, at least any one of a k-th projected forward motion vector (k being a natural number) by a forward motion vector of a block and a k-th projected backward motion vector by the forward motion vector and at least any one of a k-th projected forward motion vector by a backward motion vector and a k-th projected backward motion vector by the backward motion vector;

obtaining, by the circuitry, inconsistency of forward motion vector to k-th frame projection and inconsistency of backward motion vector to k-th frame projection by calculating, by the circuitry, a first difference function using at least any one of the forward motion vector, the k-th projected forward motion vector by the forward motion vector, and the k-th projected backward motion vector by the forward motion vector and calculating, by the circuitry, the first difference function using at least any one of the backward motion vector, the k-th projected forward motion vector by the backward motion vector, and the k-th projected backward motion vector by the backward motion vector;

calculating, by the circuitry, discontinuity using the inconsistency of forward motion vector to k-th frame projection and the inconsistency of backward motion vector to k-th frame projection, wherein the obtaining of the inconsistency of backward motion vector to k-th frame projection is performed by calculating at least any one of $$D_{M,t-k}(u_t)=M1(D1(u_t,V_{t-k}(u_t))),$$

$$D_{M,t-k}(u_t)=M1(D1(u_t,U_{t-k}(u_t))), \text{ and}$$

$$D_{M,t-k}(u_t)=M1(D1(V_{t-k}(u_t),U_{t-k}(u_t)),D1(u_t,V_{t-k}(u_t)), D1(u_t,U_{t-k}(u_t))),$$

where $D_{M,t-k}(u_t)$ denotes the inconsistency of backward motion vector to k-th frame projection, M1 denotes a first mapping formula, D1 denotes the first difference function, $u_t$ denotes the backward motion vector, $V_{t-k}(u_t)$ denotes the k-th projected forward motion vector by the backward motion vector, and $U_{t-k}(u_t)$ denotes the k-th projected backward motion vector by the backward motion vector, and wherein the calculated discontinuity is used to determine whether to perform fallback and calculate a fallback level used to perform the fallback according to a result of the determination; and outputting, by the circuitry, an image with minimized degradation based on the fallback level.

14. The method of calculating discontinuity of a motion vector of claim 1, wherein the result of the determination is based on criteria in two different points of view to a displaced image.

* * * * *